(12) United States Patent
Curtis et al.

(10) Patent No.: US 11,274,654 B2
(45) Date of Patent: Mar. 15, 2022

(54) SYSTEM AND METHOD FOR APPLICATION OF A BRAKE FOR A WIND TURBINE

(71) Applicant: General Electric Company, Schenectady, NY (US)

(72) Inventors: Justin Richard Curtis, Simpsonville, SC (US); Joseph Andrew Trzemzalski, Simpsonville, SC (US); Hammad Ahmad, Laurens, SC (US); Zachary Kurt Blaettler, Simpsonville, SC (US); Till Hoffmann, Osnabrueck (DE)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 16/170,456

(22) Filed: Oct. 25, 2018

(65) Prior Publication Data

US 2020/0132045 A1  Apr. 30, 2020

(51) Int. Cl.
*F03D 7/02* (2006.01)
*F03D 17/00* (2016.01)
(Continued)

(52) U.S. Cl.
CPC ......... *F03D 7/0248* (2013.01); *F03D 7/0264* (2013.01); *F03D 7/047* (2013.01);
(Continued)

(58) Field of Classification Search
CPC ...... F03D 7/0248; F03D 7/0264; F03D 7/047; F03D 17/00; F05B 2260/90;
(Continued)

(56) References Cited

U.S. PATENT DOCUMENTS 8,080,891 B2 * 12/2011 Schramm ................ H02P 9/102
290/44
8,210,811 B2 * 7/2012 Loh ........................ F03D 7/0224
416/1
(Continued)

FOREIGN PATENT DOCUMENTS

CN    102817776 A    12/2012
CN    202789322 U    3/2013
(Continued)

OTHER PUBLICATIONS

EP Search Report, dated Mar. 19, 2020.

*Primary Examiner* — Christopher R Legendre
(74) *Attorney, Agent, or Firm* — Dority & Manning, P.A.

(57) ABSTRACT

A wind turbine and associated control method includes a controller configured with a high speed shaft brake in the generator gear train. The controller receives an input signal corresponding to rotational speed of the high speed shaft, wherein upon the high speed shaft reaching a predefined rotational speed and under a braking condition that calls for the rotor to come to a complete standstill, the controller generates an activate signal to activate the brake. An interlock system is in communication with the low speed shaft sensor and the controller and is configured to override the activate signal when the rotational speed of the low speed shaft is above a threshold value.

5 Claims, 4 Drawing Sheets

(51) Int. Cl.
    *F03D 7/04* (2006.01)
    *F03D 1/00* (2006.01)
(52) U.S. Cl.
    CPC .............. *F03D 17/00* (2016.05); *F03D 1/00* (2013.01); *F05B 2220/30* (2013.01); *F05B 2240/221* (2013.01); *F05B 2260/80* (2013.01); *F05B 2260/90* (2013.01); *F05B 2270/1011* (2013.01); *F05B 2270/1075* (2013.01); *F05B 2270/327* (2013.01); *F05B 2270/402* (2013.01)
(58) Field of Classification Search
    CPC ...... F05B 2270/1011; F05B 2270/1075; F05B 2270/327
    See application file for complete search history.

(56) References Cited

U.S. PATENT DOCUMENTS

| | | | |
|---|---|---|---|
| 8,882,460 B2 * | 11/2014 | Merkel | F03D 7/0244 |
| | | | 416/1 |
| 9,759,192 B2 * | 9/2017 | Perley | F03D 7/0248 |
| 10,369,887 B2 * | 8/2019 | Garcha | B60L 15/007 |
| 2011/0187108 A1 | 8/2011 | Wakasa | |
| 2020/0132045 A1 * | 4/2020 | Curtis | F03D 7/0264 |

FOREIGN PATENT DOCUMENTS

| | | |
|---|---|---|
| EP | 2 108 825 A2 | 10/2009 |
| EP | 2 698 534 A2 | 2/2014 |
| ES | 2276293 T3 | 6/2007 |

\* cited by examiner

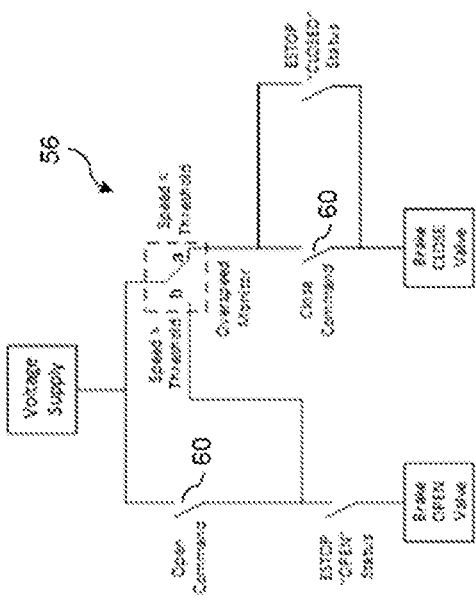

FIG. 5

| Description | Below Safe Speed Threshold | | | | Above Safe Speed Threshold | | | |
|---|---|---|---|---|---|---|---|---|
| | E-Stop Pressed | | E-Stop Not Pressed | | E-Stop Pressed | | E-Stop Not Pressed | |
| | Open Command Issued | Close Command Issued | Open Command Issued | Close Command Issued | Open Command Issued | Close Command Issued | Open Command Issued | Close Command Issued |
| Speed Monitor | Position a | Position a | Position a | Position a | Position b | Position b | Position b | Position b |
| open command relay | CLOSED | OPEN | CLOSED | OPEN | CLOSED | OPEN | CLOSED | OPEN |
| Close Command Relay | OPEN | CLOSED | OPEN | CLOSED | OPEN | CLOSED | OPEN | CLOSED |
| Estop Status | CLOSED | CLOSED | OPEN | OPEN | CLOSED | CLOSED | OPEN | OPEN |
| Brake Condition | CLOSED | CLOSED | OPEN | CLOSED | OPEN | OPEN | OPEN | OPEN |

FIG. 6

SYSTEM AND METHOD FOR APPLICATION OF A BRAKE FOR A WIND TURBINE

FIELD OF THE INVENTION

The present subject matter relates generally to wind turbines, and more particularly to a system and method for controllably applying a mechanical brake in a wind turbine drive train.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox. The generator then converts the mechanical energy to electrical energy that may be deployed to a utility grid.

Modern utility-grade wind turbines generally include redundant braking systems. An aerodynamic braking system slows or stops rotation of the rotor blades by pitching the blades to a feathered position. Such systems may include a stored energy source to enable the rotor blades to be pitched during a power failure. A mechanical braking system, such as a hydraulic brake, is also generally provided in the drive train to hold the rotor in a stopped state (e.g. a "parking brake"), for example in a shutdown condition. A stored energy source, such as a hydraulic accumulator, may enable actuation of the mechanical brake during a power failure.

Extreme loads are generated on various wind turbine components at rotor overspeed conditions, particularly at overspeed fault conditions, and it is thus an important operating consideration to maintain tight control over the rotor speed. The fault loads on the rotor blades, hub, and main shaft are typically the design driving loads for these components. Under traditional braking control methods, aerodynamic braking is utilized at rotor speeds in excess of nominal rotor speed and the mechanical brake is applied after the turbine faults at a defined rotor speed, typically in accordance with a time-dependent braking profile. However, even with this control methodology, the extreme transient loads experienced at the fault speed are not significantly eliminated and the mechanical brake components (as well as other drive train components) can be significantly damaged if the brake is actuated too soon.

CN 202789322U and CN 102817776 both describe a high-speed axle brake safety system for a wind power generator that includes a high-speed shaft rotation speed detecting module and a high-speed shaft brake module. A safety module includes a safety module input unit and a relay output unit connected with the safety module input unit. The output end of the high speed shaft speed detecting module is connected to the safety module input unit, and the relay output unit is connected to the high speed shaft brake module. Because the system is provided with a high-speed shaft rotation speed detecting module, the safety module triggers the high-speed shaft brake module when determining that the high-speed shaft speed is lower than a certain rated value, thereby reducing the risk of wear of the high-speed shaft and avoiding a major accident of the wind power generator set.

The above-cited system and method rely on speed detection of the high speed shaft as the input for the shutdown command as well as the trigger for the safety module. If the speed detection signal is not accurate, then the brake may be activated at shaft speeds that can damage the brake and other drive train components.

The present system and method provide an improved method and system for activation of the high speed shaft brake at safe speeds to minimize possible damage to the brake and other drive train components.

BRIEF DESCRIPTION OF THE INVENTION

Aspects and advantages of the invention will be set forth in part in the following description, or may be obvious from the description, or may be learned through practice of the invention.

In accordance with aspects of the present subject matter, a wind turbine is provided that includes a rotor with a plurality of rotor blades configured thereon, the rotor connected to a generator via a drive train. The drive train includes a low speed shaft coupled to an input of a gear box, and a high speed shaft coupled to an output of the gearbox. A brake is configured with the high speed shaft. A low speed shaft sensor is disposed in the drivetrain to determine rotational speed of the low speed shaft. A controller is configured with the brake and receives an input signal for rotational speed of the high speed shaft. Upon the high speed shaft reaching a predefined rotational speed, under certain braking conditions for which the rotor must come to a complete standstill, the controller generates an activate signal to activate the brake. An interlock system is in communication with the low speed shaft sensor and the controller and is configured to override the activate signal to prevent application of the brake when the rotational speed of the low speed shaft is above a threshold value.

In a particular embodiment, the input signal to the controller for rotational speed of the high speed shaft is derived from the signal from the low speed shaft sensor. For example, the rotational speed of the low speed shaft may be multiplied by the gear ratio of the gearbox to derive the high speed shaft rotational speed.

In one embodiment, an emergency stop system is in communication with the interlock system, wherein the interlock system overrides an emergency stop signal from the emergency stop system to apply the brake when the rotational speed of the low speed shaft is above the threshold value. The emergency stop system may be configured to bypass the controller.

In yet another embodiment, the low speed shaft sensor is also in communication with the controller, wherein the controller is configured to monitor operation of the interlock system based on input from the low speed shaft sensor. Thus, the controller can periodically or continuously verify functionality of the interlock system based on the low speed shaft speed signal and the defined threshold value.

In an embodiment of the interlock system, a plurality of relays are configured in a logic circuit that ensures the brake does not activate under a plurality of operational scenarios when the rotational speed of the low speed shaft is above the threshold value. The relays may be mechanical, electrical, or electro-mechanical.

The present invention also encompasses a method for controlling actuation of the high speed shaft brake in a wind turbine, wherein the wind turbine includes a rotor with a plurality of rotor blades configured thereon, the rotor connected to a generator via a drive train that includes a low speed shaft coupled to an input of a gear box, and a high speed shaft coupled to an output of the gearbox. The method includes determining rotational speed of the low speed shaft with a low speed shaft sensor disposed in the drivetrain. A high speed shaft rotational speed signal is input to a controller configured with the brake wherein, under certain braking conditions for which the rotor must come to a complete standstill, the controller generates an activate signal for the brake upon the high speed shaft reaching a predefined rotational speed. The method includes overriding the activate signal when rotational speed of the low speed shaft determined by the low speed shaft sensor is above a threshold value.

One embodiment of the method may include deriving the high speed shaft rotational speed input signal from the low speed shaft sensor.

The method may include generating an emergency stop signal that bypasses the controller, and overriding the emergency stop signal when the rotational speed of the low speed shaft is above the threshold value.

In a particular embodiment, the overriding step is performed by an interlock system in communication with the low speed shaft sensor that is also in communication with the controller, and the method includes monitoring operation of the interlock system with the controller based on input from the low speed shaft sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 is an embodiment of a relay circuit; and

FIG. 6 is a table of different logic states of the relay circuit of FIG. 5.

DETAILED DESCRIPTION OF THE INVENTION

Figure 1:
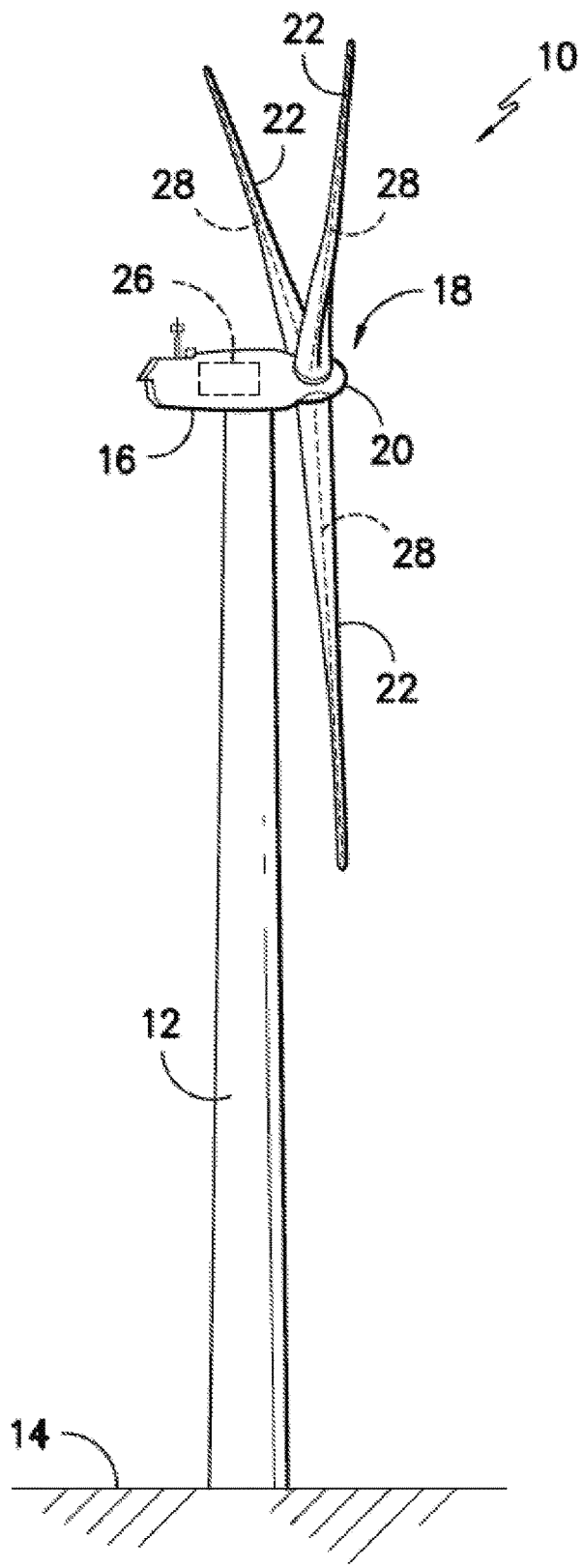
FIG. 1 illustrates a perspective view of one embodiment of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As mentioned, the present disclosure relates to actuation of a brake to the high speed shaft of a wind turbine. Referring to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and one or more rotor blades 22 coupled to and extending outwardly from the hub 20. The rotor blades 22 are spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or main controller 26 centralized within the nacelle 16. In general, the main controller 26 may comprise a computer or other suitable processing unit. Thus, in several embodiments, the main controller 26 may include suitable computer-readable instructions that, when implemented, configure the controller 26 to perform various different functions, such as receiving, transmitting and/or executing wind turbine control signals (e.g., pitch commands). As such, the main controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 as well as the loads acting on the rotor blade 22. For example, the main controller 26 may individually control the pitch angle of each rotor blade 22 by transmitting suitable pitch commands to a pitch system 30 (FIG. 2) of the rotor blade 22. The pitch system 30 may include a pitch adjustment mechanism 36 and a pitch controller 38. Each pitch adjustment mechanism 36 may include a pitch drive motor 40, a pitch drive gearbox 42, and a pitch drive pinion 44 that causes rotation of a pitch bearing 46.

Figure 2:
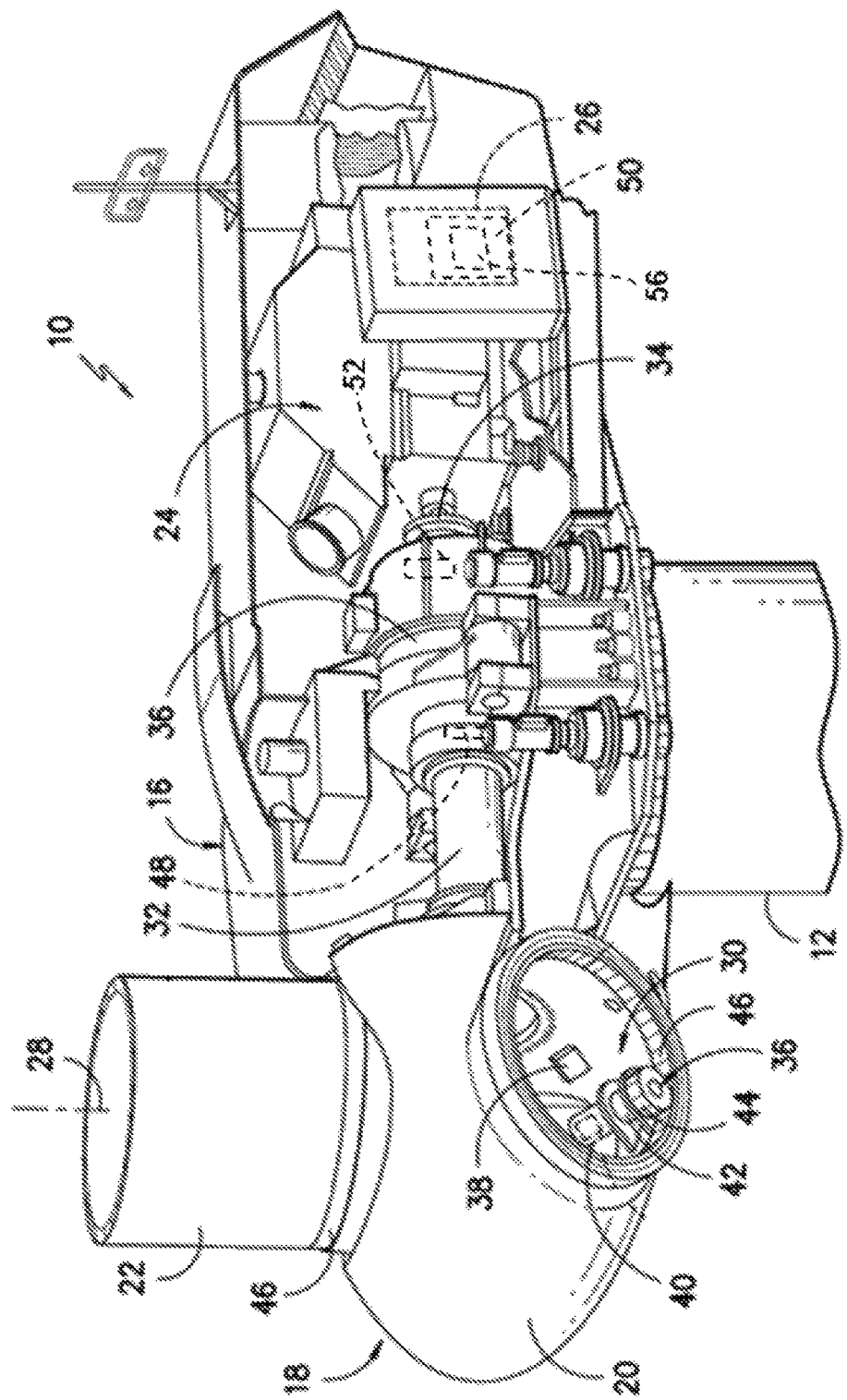
FIG. 2 illustrates a wind turbine drive train within a nacelle incorporating aspects of the present invention.

Referring now to FIG. 2, an internal view of one embodiment of the nacelle 16 of the wind turbine 10 shown in FIG. 1 is illustrated. As shown, a generator 24 is disposed within the nacelle 16 and is coupled to the rotor 18 via a drive train 54 (FIG. 3) for producing electrical power from the rotational energy generated by the rotor 18. For example, the rotor 18 may include a rotor shaft 32 (the low speed shaft) coupled to the hub 20 for rotation therewith. The rotor shaft 32 may, in turn, be rotatably coupled to a generator shaft 34 (the high speed shaft) of the generator 24 through a gearbox 36. As is generally understood, the rotor shaft 32 provides a low speed, high torque input to the gearbox 36 in response to rotation of the rotor blades 22 and the hub 20. The gearbox 36 converts the low speed, high torque input to a high speed, low torque output to drive the generator shaft 34 and, thus, the generator 24.

The main controller 26 may be located within the nacelle 16 and communicatively coupled to any number of the components of the wind turbine 10 in order to control the operation of such components. For example, as indicated above, the main controller 26 may be communicatively coupled to each pitch system 30 of the wind turbine 10 (one of which is shown) to facilitate rotation of each rotor blade 22 about its pitch axis 28.

Figure 3:
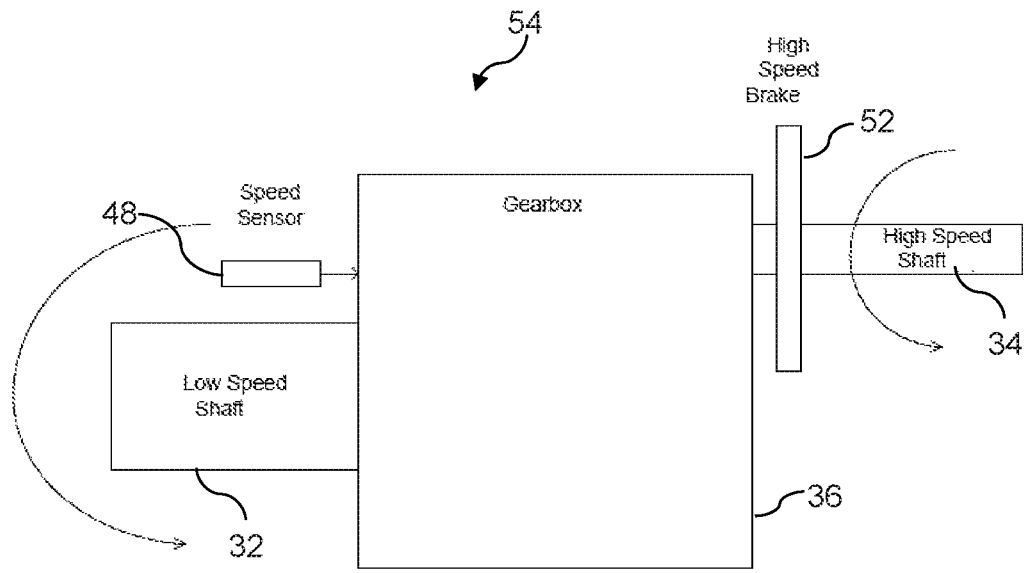
FIG. 3 is a simplified diagram of a wind turbine drivetrain.

Referring to FIGS. 2 and 3, a rotational speed sensor 48, such as an optical encoder or any other suitable speed sensor known in the industry, is operatively disposed in the drivetrain 54 to directly or indirectly determine rotational speed of the low speed shaft 32. The sensor 48 may be disposed directly adjacent the low speed shaft 32 or at any other suitable location, such as within the gearbox 36.

Referring to FIGS. 2 and 3, a braking system is operatively configured with the high speed shaft 34 and includes a brake 52 controlled by a brake controller 50 that issues brake activate commands to the brake 52 at certain operating conditions, such as a shutdown condition. Although not limited to a particular construction, the brake 52 in one embodiment may be a disc and caliper arrangement, such as a hydraulically actuated disc and caliper brake, that is sufficient to bring the rotor to a full stop and hold the rotor at a fault condition, for example an overspeed fault. Reference may be made to U.S. Pat. No. 6,265,785 for a more detailed description of a suitable hydraulic braking system that may be used in embodiments of the present invention. The brake 52 may be any suitable device or system that applies a braking torque to the rotor via the high speed shaft 34, such as a mechanical brake, electric motor brake, hydraulic brake, water brake, and the like.

Figure 4:
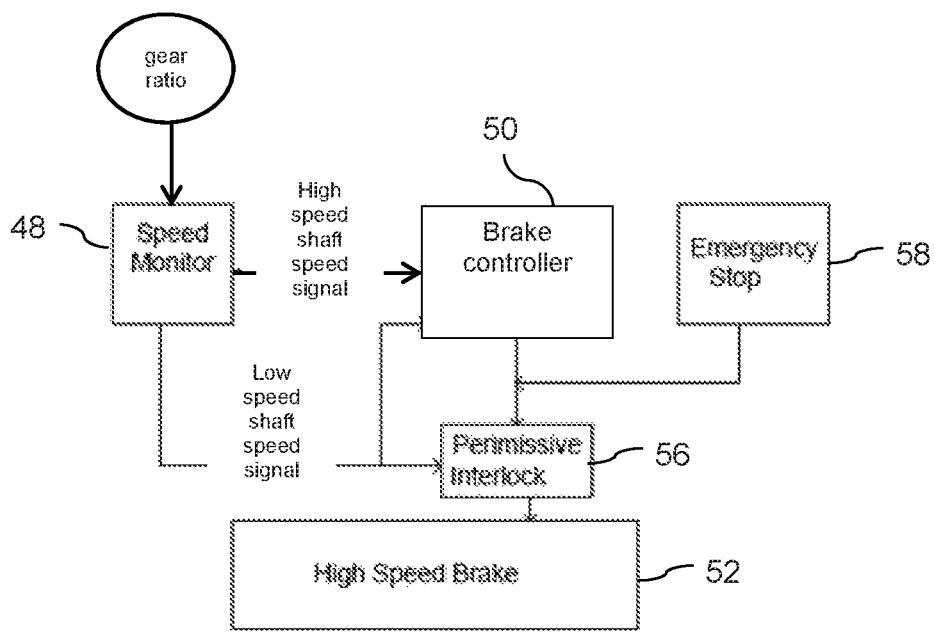
FIG. 4 is an operational block diagram in accordance with aspects of the invention.

Referring to FIGS. 3 and 4, the brake controller 50 receives an input signal for rotational speed of the high speed shaft. This signal may be generated from the low speed shaft sensor 48 by applying the gear ratio from the gearbox 36 to the rotational speed of the slow speed shaft 32. Upon the high speed shaft 34 reaching a predefined rotational speed, under certain braking conditions for which the rotor must come to a complete standstill, the controller 50 generates an activate signal to activate the brake 52. An interlock system 56 is in communication with the low speed shaft sensor 48 and the controller 50 and is configured to override the activate signal to prevent application of the brake 52 when the rotational speed of the low speed shaft 32 is above a threshold value, which is selected to prevent damage to the brake 52 and/or other drive train components.

As depicted in FIG. 4, an emergency stop system 58 may be provided that bypasses the brake controller 50 and is used to generate a brake command in the event of an emergency condition. The interlock system 56 is functionally configured between the emergency stop system 58 and the brake 52 in order to override an emergency stop signal from the emergency stop system 56 to apply the brake 52 when the rotational speed of the low speed shaft 32 is above the threshold value.

As depicted in FIG. 4, the low speed shaft sensor 48 may be in communication with the brake controller 50, wherein the controller is configured to monitor operation of the interlock system 52 based on input from the low speed shaft sensor 48. For example, the controller 50 may monitor the low speed shaft speeds at which the interlock system 56 overrides the brake command from the controller 50 to ensure proper functioning of the low speed shaft sensor 48 and the interlock system 56. Thus, the controller can periodically or continuously verify functionality of the interlock system based on the low speed shaft speed signal and the defined threshold value.

The interlock system 56 may be any suitable hardware/software configuration to achieve the functions described herein. In a particular embodiment depicted in FIG. 5, the interlock system 56 includes a plurality of relays 60 configured in a logic circuit that ensures the brake 52 does not activate under a plurality of operational scenarios when the rotational speed of the low speed shaft 32 is above the threshold value. The relays 60 may be mechanical, electrical, or electro-mechanical. The table of FIG. 6 provides the state of the relays 60 in various operations conditions of the wind turbine.

In the provided example, a predefined "speed threshold" value for the low speed shaft rotational speed is defined in the system. FIG. 5 depicts the "normal" state of the interlock system 56 for a de-energized (shutdown) turbine. Referring to the table in FIG. 6, at speeds below the threshold speed value, the speed monitor relay ("overspeed monitor") is in position "a" depicted in FIG. 5. The brake valve that activates the brake 52 can only be energized when the relay is in this position "a". In this position, if an emergency stop (E-Stop) signal is issued, the brake valve is energized regardless of the state of the "open command" or "close command" relay. Without an E-Stop signal, the valve will be energized to apply the brake when a close command is generated by the brake controller.

The speed monitor relay is in position "b" at speeds of the low speed shaft greater than the threshold speed value. In this position, the valve is not energized to activate the brake 52 in any condition.

The present invention also encompasses a method for controlling actuation of the high speed shaft brake 52 in a wind turbine 10 described above. The method includes determining rotational speed of the low speed shaft 32 with a low speed shaft sensor 48 disposed in the drivetrain 54. A high speed shaft rotational speed signal is input to a controller 50 configured with the brake, wherein the controller 50 generates an activate signal for the brake 52 upon the high speed shaft 34 reaching a predefined rotational speed under certain braking conditions for which the rotor must come to a complete standstill. The method includes overriding the activate signal when rotational speed of the low speed shaft 32 determined by the low speed shaft sensor 48 is above a threshold value.

One embodiment of the method may include deriving the high speed shaft rotational speed input signal to the controller 50 from the low speed shaft sensor 48.

The method may include generating an emergency stop signal that bypasses the controller 50, and overriding the emergency stop signal when the rotational speed of the low speed shaft 32 is above the threshold value.

The step of overriding the brake activate signal from the controller 50 or the emergency stop system 58 step is performed by an interlock system 56 in communication with the low speed shaft sensor 48 (which is also in communication with the controller 50). The method may include monitoring operation of the interlock system 56 with the controller 50 based on input from the low speed shaft sensor 48.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine, comprising:
a rotor with a plurality of rotor blades configured thereon, the rotor connected to a generator via a drive train;
the drive train comprising a low speed shaft coupled to an input of a gear box, and a high speed shaft coupled to an output of the gear box;
a brake configured with the high speed shaft;
a low speed shaft sensor disposed in the drivetrain to detect rotational speed of the low speed shaft;
a controller configured with the brake and to receive an input signal corresponding to rotational speed of the high speed shaft measured directly at the high speed shaft, wherein upon the high speed shaft reaching a predefined rotational speed as indicated by the input signal, the controller generates an activate signal for activating the brake under a braking condition that calls for the rotor to come to a complete standstill; and
interlock means comprising a plurality of relays configured in a logic circuit in communication with the low speed shaft sensor and the controller, the relays configurable while the activate signal is generated by the controller to override the activate signal when the rotational speed of the low speed shaft is above a threshold value selected to prevent damage to the brake and components of the drive train by application of the brake, the relays reconfigurable to release the override of the activate signal upon the rotational speed of the low speed shaft falling below the threshold value such that the activate signal activates the brake.

2. The wind turbine as in claim 1, wherein the low speed shaft sensor is in communication with the controller.

3. A method for controlling actuation of a high speed shaft brake in a wind turbine, wherein the wind turbine includes a rotor with a plurality of rotor blades configured thereon, the rotor connected to a generator via a drive train that includes a low speed shaft coupled to an input of a gear box, and a high speed shaft coupled to an output of the gear box, the method comprising:
with a low speed shaft sensor disposed in the drivetrain, determining rotational speed of the low speed shaft;
inputting a high speed shaft rotational speed signal measured at the high speed shaft to a controller configured with the brake and, under a braking condition that calls for the rotor to come to a complete standstill, generating an activate signal by the controller for the brake upon the high speed shaft reaching a predefined rotational speed; and
while the activate command is being generated by the controller, overriding the activate signal upon rotational speed of the low speed shaft determined by the low speed shaft sensor increasing above a threshold value selected to prevent damage to the brake and components of the drive train by application of the brake; and
releasing the override of the activate signal upon the rotational speed of the low speed shaft falling below the threshold value such that the activate signal activates the brake.

4. The method as in claim 3, wherein the overriding the activate signal is performed by an interlock system in communication with the low speed shaft sensor, the interlock system comprising a plurality of relays configured in a logic circuit.

5. The method as in claim 4, wherein the low speed shaft sensor is in communication with the controller.

* * * * *